United States Patent
Rednikov

(10) Patent No.: US 8,313,057 B2
(45) Date of Patent: Nov. 20, 2012

(54) AIRCRAFT

(75) Inventor: Valeriy Vasilievich Rednikov, Moscow (RU)

(73) Assignee: Rednikov Valeriy Vasilievich, Moscow (RU)

( * ) Notice: Subject to any disclaimer, the term of this patent is extended or adjusted under 35 U.S.C. 154(b) by 1548 days.

(21) Appl. No.: 10/544,358

(22) PCT Filed: Jan. 26, 2004

(86) PCT No.: PCT/RU2004/000021
§ 371 (c)(1),
(2), (4) Date: Aug. 3, 2005

(87) PCT Pub. No.: WO2004/069654
PCT Pub. Date: Aug. 19, 2004

(65) Prior Publication Data
US 2006/0065780 A1  Mar. 30, 2006

(30) Foreign Application Priority Data
Feb. 5, 2003  (RU) ................................. 2003103406

(51) Int. Cl.
 *B64F 1/02* (2006.01)
(52) U.S. Cl. .................................. 244/110 R; 244/110 C
(58) Field of Classification Search .............. 244/110 G, 244/110 C, 110 F, 110 R
See application file for complete search history.

(56) References Cited

U.S. PATENT DOCUMENTS

| | | | | |
|---|---|---|---|---|
| 1,716,670 A * | 6/1929 | Sperry | ............................... | 244/2 |
| 1,748,663 A * | 2/1930 | Tucker | ............................. | 244/63 |
| 1,836,010 A * | 12/1931 | Audrain | ........................ | 244/63 |
| 1,842,432 A * | 1/1932 | Stanton | ........................... | 244/63 |
| 1,869,506 A * | 8/1932 | Richardson | ........................ | 244/2 |
| 1,912,723 A * | 6/1933 | Perkins | ............................. | 244/63 |
| 2,435,197 A * | 2/1948 | Brodie | ........................ | 244/110 F |
| 2,448,209 A * | 8/1948 | Boyer et al. | ............... | 244/110 F |
| 2,488,050 A * | 11/1949 | Brodie | ........................ | 244/110 F |
| 4,311,290 A * | 1/1982 | Koper | ........................ | 244/110 R |
| 4,523,729 A * | 6/1985 | Frick | ............................. | 244/115 |
| 4,753,400 A * | 6/1988 | Reuter et al. | ............... | 244/110 R |
| 5,054,717 A * | 10/1991 | Taylor | ........................ | 244/110 F |
| 6,264,140 B1 * | 7/2001 | McGeer et al. | ............ | 244/110 F |
| 6,874,729 B1 * | 4/2005 | McDonnell | ..................... | 244/63 |
| 7,175,135 B2 * | 2/2007 | Dennis et al. | ............. | 244/110 C |

* cited by examiner

*Primary Examiner* — Benjamin P Lee

(57) ABSTRACT

The inventive aircraft with off-aerodrome landing consists of a body (1), a lifting wing (2) and the onboard part of a rope arresting and landing device comprising an arresting hook (5) which is provided with a grip (6). In the preferred embodiment, said aircraft is provided with a propeller (3) arranged in an annular empennage (4). Said arresting hook is arranged in such a way that it is rotatable around the transversal axis (8) of the aircraft situated in a longitudinal spacing of the aerodynamic mean chord of the wing. The aircraft leads for landing with the upwardly deployed arresting hook in such a way that the trajectory (12) of a top pickup point (6) is higher than the trajectory (13) of the highest top point of the aircraft and higher than a cable or rope (14) tensed on a landing area. The trajectory (13') of the highest point of the aircraft located ahead of the arresting hook passes at a lower level than the cable (14). In said conditions, the grip of the arresting hook holds the cable which has a required effort for drawing it from a stationary arresting device. By overcoming said effort, the aircraft spends a flight kinetic energy and stops being suspended on the cable.

3 Claims, 3 Drawing Sheets

AIRCRAFT

CROSS-REFERENCE TO RELATED APPLICATIONS

Not Applicable.

STATEMENT REGARDING FEDERALLY SPONSORED RESEACH OR DEVELOPMENT

Not Applicable.

THE NAMES OF THE PARTIES TO A JOINT RECEACH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The present invention relates to the field of aeronautics, and more particularly to the construction of aircrafts (e.g., civil airplanes, gliders and model airplanes) with an arresting hook for a landing onto a suspended cable.

2. Description of the Prior Art

One group of such aircrafts is represented by the manned airplanes having an arresting hook for engagement with the cable of a cable landing device (here a term "cable" is understood any flexible element as a rope, a cable, a chain, ets.).

The cable landing system (SU No. 1837038, Int.Cl.$^7$ B 64 F 1/02, 30.08.90) includes a manned aircraft with an arresting hook into the fuselage nose section, and a cable is suspended between two jib cranes situated at a landing position. The arresting hook has a grip portion.

Before a landing the aircraft flies into the cable with the angle of attack beyond stall, providing almost vertical aircraft position with the help of an engine thrust. After a moment of landing by means of engagement of the grip portion of the arresting hook with the cable, the aircraft is decelerated and comes to stop. The aircraft becomes suspended at the nose section to the cable with the tail unit downwards.

The aircraft with the such system of the cable landing has disadvantages including:

a) Engines with the total thrust exceeding an aircraft weight;
b) A complex control system of the aircraft;
c) Additional fuel for a complex landing maneuver;
d) A pilot of the highest qualification;
e) High strength of the fuselage.

Most types of aircrafts, including civil airplanes, glides and unmanned airplanes, do not meet these requirements, and therefore are unsuitable for such cable landing technique.

However, the cable landing device applied in this system is suitable to use without any changes, or with significant simplifications for the landing of model airplanes, gliders and unmanned airplanes using this invention.

Another cable landing system (J. H. BRODIE, U.S. Pat. No. 2,488,050, U.S. Cl. 244/110, Nov. 15, 1949) is equipped with a elevated runway. Along this runway a trolley can move with a catching sling across and below the runway. The aircraft has an arresting hook with a grip portion. Before a landing the hook extends above the aircraft by its grip portion. The aircraft flies under the catching sling for the landing by engagement of the grip portion with the catching sling. After engagement the aircraft is decelerated by braking force of the trolley and comes to stop.

This aircraft has a support device which transmits braking force to the aircraft along the line passing through the center of gravity of the aircraft. For this purpose the axis of rotation of the arresting hook is located transversely of the aircraft on a moveable support. Before the landing the center of gravity of the aircraft is calculated, and the support is moved with a drive (controlled by the pilot) so, that the axis would pass through the center of gravity of the aircraft. As a result of engagement, braking force is applied from the catching sling to the arresting hook and passes through the center of gravity of the aircraft, and therefore, there is no any pitching moment (M) in the course of flight braking. Therefore, the aircraft retains practically a level position all over the period of flight braking.

The disadvantages of this aircraft includes complexity and cost of the aircraft with a support device, a difficult piloting due to a support motion operation with a preliminary calculation of the center of gravity, and the weight of equipment aboard the aircraft. Another disadvantages are low reliability (there is probability of a flight accident because of incorrect setting of the support) and narrow field of application of the cable landing, especially for the light unmanned aircrafts.

BRIEF SUMMARY OF THE INVENTION

A general purpose of the present invention is to improve current techniques in the following respects: improvement of landing reliability and useful load of the aircrafts with lower cost, and also expansion of field of application (including passenger-carrier airplanes, gliders, airplane models and unmanned airplanes).

These problems are solved by the above known landing device with a cable suspended between two jib cranes, which are situated at a landing position, and the aircraft with a lifting wing and an arresting hook, including the grip portion. This book being mounted on the aircraft for pivotal movement about an axis extending transversely of the aircraft, and being located in or deployable to a position, in which the hook extends above the aircraft by the grip portion, for engagement of the grip portion with the cable of a cable landing device.

The axis of pivotal movement of the hook being located within an area defined by longitudinal expanse of the mean aerodynamic chord, above and behind of the center of gravity of the aircraft.

In the aircraft the axis of rotation of the arresting hook can be located immobile with respect to the aircraft and in parallel to a lateral axis.

BRIEF DESCRIPTION OF THE DRAWINGS

These objects and subject of the present invention are explained by the drawings, wherein.

DETAILED DESCRIPTION OF THE INVENTION

Figure 1:
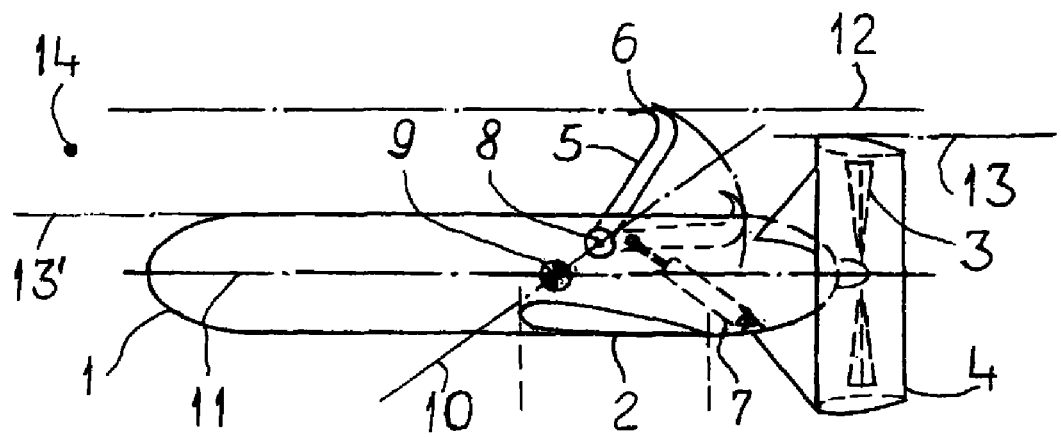
FIG. 1 is a diagrammatic left side view of the aircraft with the preferable embodiment of the present invention. It is the view of an unmanned aircraft (see the table below) with a pusher propeller and an arrested hook. The aircraft is shown approaching a cable in a level flight.

Referring now to the drawings in detail, and initially to FIG. 1, where an unmanned aircraft is built on a normal aerodynamic configuration. The aircraft has a fuselage 1 and a lifting low wing 2 located in the center fuselage. In the aft fuselage there is a pusher propeller 3 installed into a cylindrical stabilizer fin 4. Aboard the aircraft there are an arresting hook 5 with a grip portion 6, a shock-absorber 7 (for example, as in every car) and an arresting hook drive for a hook motion from the removed position (shown by dash lines) into the deployed position (shown by solid lines). This drive is not shown to avoid shading of the main elements).

The arresting hook 5 is mounted on the aircraft capable of rotating around an axis 8 (shown by a circle with a point) laying transversely of the aircraft in parallel to a body transverse (another name "lateral") axis. Axis 8 is located within the longitudinal expanse of the mean aerodynamic chord, and above and behind the center of gravity 9 (shown by a circle with shaded sectors of the aircraft. A stroke—dotted line 10 passes through the center of gravity 9 and the crossing point of the axis 8 with an aircraft main plane (another name is "a plane of symmetry"). When braking force passes along this line the pitching moment (M) is zero. The longitudinal expanse occupied by the mean aerodynamic chord is shown on the fuselage by two dash lines, normally to the center line 11 (another names "longitudinal axis" or " body longitudinal axis").

In the deployed position the arresting hook is set so that a grip portion 6 appears above the aircraft approaching the cable. Thus, the path 12 of a top point of the grip portion 6 appears above the path 13 of a top point of the aircraft (in this case this is the top point of the cylindrical stabilizer fin 4) and higher than the cable 14. The path 13' of the highest point of the aircraft located ahead of the arresting hook passes below the cable 14.

The shock-absorber 7 of FIG. 1 is shown by dash lines in the removed position.

The aircraft (FIG. 2) is also built on a normal aerodynamic configuration. The aircraft has the tractor propeller 3 installed in the front fuselage 1, a horizontal stabilizer 15, a vertical stabilizer 16, a nose landing gear 17 and a main landing gear 18. The hook drive and shock-absorber are not shown in this figure.

This aircraft embodiment is the least preferable because the path 12 of the aircraft top point is the path of the top point of the propeller disk, which passes below the cable 14 in a dangerous propeller cable clearance. For partial compensation of this disadvantage the aircraft arresting hook should be almost one third longer than the device of FIG. 1 at relatively comparable dimensions of aircrafts.

In the removed position the arrested hook 5 is shown by dash lines.

Except for the above embodiments, the claimed aircraft is perfectly applicable to gliders, and also for jets characterized by one vertical stabilizer and the engines located under the wing or in the aft fuselage. For another aircrafts as a rule the arresting hook lengthened almost twice is required. (However, such aircrafts will have all advantages of the claimed aircraft).

Figure 3:
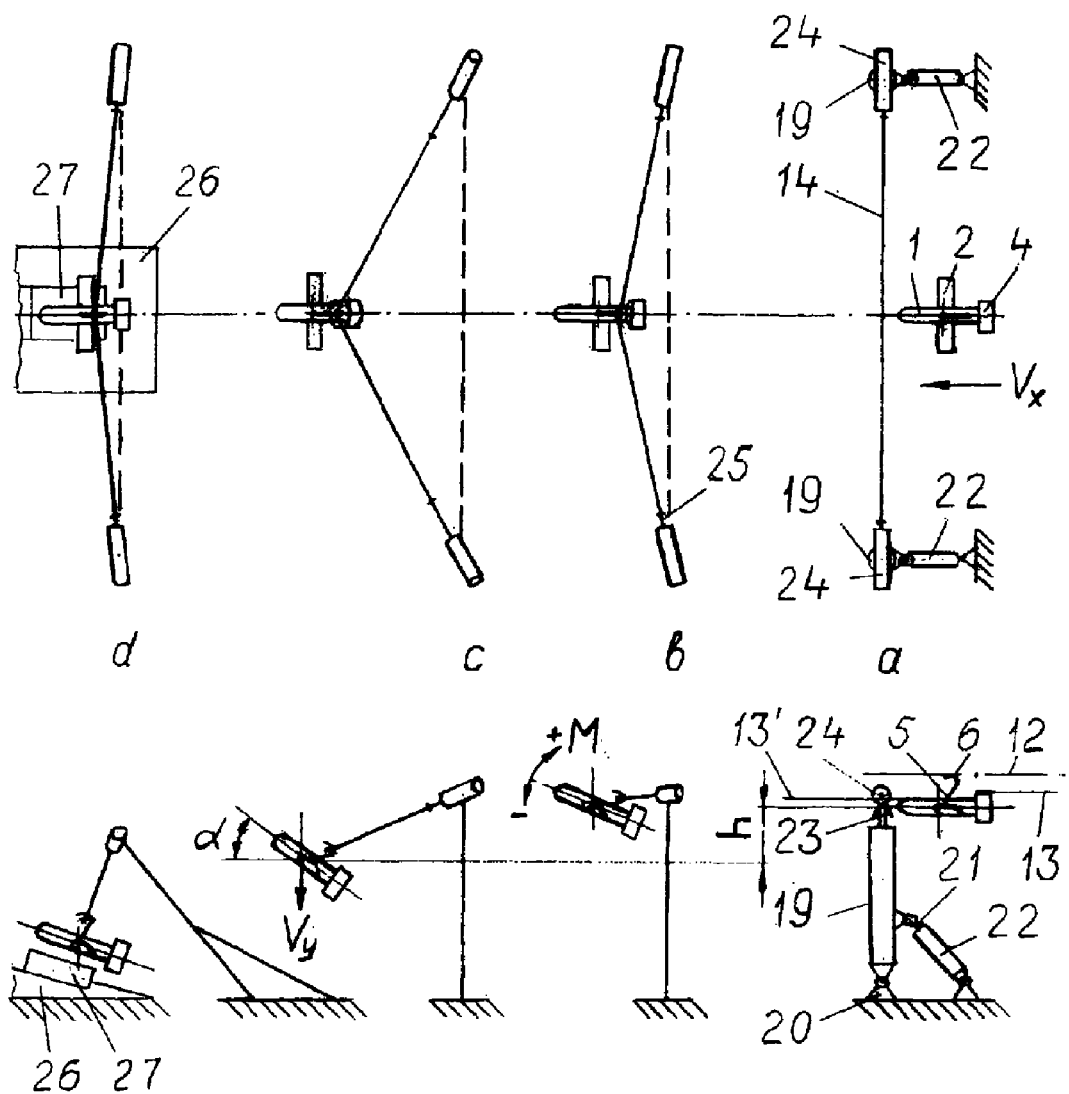
FIG. 3 shows diagrammatic plan views and diagrammatic side views of the four stages of the cable landing of the unmanned aircraft of FIG. 1.

The cable landing device of FIG. 3 is shown in four working stages (a, b, c, d), and is borrowed with some simplifications from the prior art mentioned above.

This device (FIG. 3a) comprises two identical jib cranes, which are located onto a landing position. The jib cranes are mutually connected by the suspended cable 14. The stages b, c, d show the different diagrammatic images of the cable landing device with the engaged aircraft.

Each crane comprises a telescopic jib 19, established with the help of a hinged support 20. The telescopic jib 19 through another hinge is connected to a rod 21 of a hydraulic power cylinder 22 attached by its hinge.

On the top section of each jib 19 there is a two-degree-of-freedom suspension 23, inclusive a shock-absorber 24 with a rod 25. The coming out rods 25 of the shock-absorbers 24 are joined with each other by the cable 14.

On the landing position a catapult 26 with the carriage 27 can be provided for a particular type of the aircraft.

The cable landing is based on the direct braking effect of the flying aircraft after its engagement with the suspended cable of the cable landing device.

After engagement, if the aircraft drag and thrust is not taken into account, the aircraft motion is defined by the horizontal distance of deceleration to stop (the track of flight braking), by descent of the aircraft, by the aircraft pitch motion around the body transverse axis, due to action of braking force from the cable landing device, and by gravity.

In a table below there are calculated results of the tracks of flight braking and the flight braking period of various types of aircrafts. These results depend on load factors arising during braking of the flying aircraft, from the moment of aircraft engagement to the stop of the horizontal motion of the aircraft.

In this table the track of flight braking and the flight braking period in a horizontal motion are given by the following equations:

Track of flight braking: $S = V_x^2 / 2a$

Flight braking period: $T = V_x / a$, where $V_x$—landing speed (m/sec);
a—deceleration (m/sec$^2$)
(or, dividing by 9.8 m/s$^2$ one obtains the flight deceleration expressed in load factors).

| Model of aircraft (notes) | Landing weight (kg) | Deceleration (load factors) | Landing speed $V_x$ (m/sec) | Track of flight braking S (m) | Flight braking period T (sec) |
|---|---|---|---|---|---|
| 1. Pchela-1T | 138 | 5 | 33 | 11.1 | 0.67 |
| Unmanned | 138 | 10 | 33 | 5.6 | 0.34 |
| 2. IL-103 | 1360 | 1 | 35 | 63.5 | 3.57 |
| (4 seats) | 1360 | 1.5 | 35 | 41.7 | 2.38 |
|  | 1360 | 2 | 35 | 31.25 | 1.79 |
| 3. Yak-40 (32 | 15500 | 1 | 56 | 160 | 5.72 |
| passengers) | 15500 | 1.5 | 56 | 106.7 | 3.81 |
|  | 15500 | 2 | 56 | 80 | 2.86 |
| 4. F/A-18 | 25400 | 3 | 69 | 81 | 2.35 |
| Hornet | 25400 | 4 | 69 | 60.7 | 1.76 |
| (1 seat) | 25400 | 5 | 69 | 48.6 | 1.4 |
| 5. Boeing | 340000 | 1 | 66 | 222.3 | 6.72 |
| 747-200B | 340000 | 1.5 | 66 | 148.2 | 4.49 |
| (300 passengers) | 340000 | 2 | 66 | 111.15 | 3.37 |

The aircraft landing begins with the aircraft approaching the catching cable 14 tensed at the landing position (FIG. 3a). Then, the aircraft arresting hook 5 is put forward into the deployed position (if the hook is not in the permanently deployed position) and the aircraft flies so, that in the most simple and most convenient variant means a straight and level flight with minimum speed. In such a way, all aerodynamically significant elements are passing below the cable 14, and the grip portion 6 is caught by the cable 14 tensed whenever possible in horizontal plane (a small cable sag due to the own weight is inevitable).

FIG. 3a shows an unmanned aircraft approaching the cable with a minimum level flight speed $V_x$, which is in this case the landing speed, and is directed from right to left. Thus, on a side view the path 12 of the top point of the grip portion 6 appears above the cable 14 (which is in the center of the shock-absorber 24) and the path 13', of the aircraft top point placed ahead the arresting hook, appears below the cable 14. On the plan view the aircraft path passes approximately in the middle of the cable length and normally to the cable.

Under such flight conditions the arresting hook 5 flies into the cable 14, and as a result of the cable and hook interaction, the hook slightly turns closer to the line 10. Due to the airplane motion the cable slides along the hook and enters into the grip portion 6. Fluctuations of the arresting hook 5 during the cable catching are damped by the shock-absorber 7.

After cable catching, the aircraft continues the flight corrected by action of braking force from the cable 14, which is fixed on the rods 25 of the shock-absorbers 24. By aircraft inertia force the two-degree suspensions 23 provide the shock-absorbers 24 turning both on horizontal and vertical planes. Thus, the cable 14 sags down (FIG. 3b) and extends the rods 25 from the turning shock-absorbers 24. Resultant force of extension of the rods 25 out of the shock-absorbers 24 forms braking force applied to the aircraft through the grip portion 6 of the arresting hook 5.

As a result of brake force action, the aircraft flight speed is slowed down, but, due to the upward component of braking force, the aircraft rises upwards at a fraction of a second. Thus, the arresting hook 5 continues to turn back in respect to the aircraft and passes the line 10. After that, from braking force the aircraft receives an increasing pitching-up moment (+M), causing the aircraft pitching-up motion (FIG. 3b). But, as the aircraft flight speed is slowed down, so the lifting force (another name "lift") is decreased. Therefore, the aircraft gradually descends with increasing vertical speed (V), and because of aircraft pitch-up the arresting hook 5 turns back and passes the line 10 ones more. Then, from the braking force, the aircraft receives pitching-down moment (−M), which aspires to return the aircraft into the level-flight position.

At last, the aircraft level-flight speed is slowed down to zero (FIG. 3c), and sagging of the cable 14 reaches the maximum (the sag value projected on the horizontal plane is equaled to the aircraft track of flight braking). The aircraft weight is not enough for holding the extended rods 25 in the former position, so the shock-absorbers 24 involve the rods practically at half. As a result of it, the cable sag decreases. The aircraft remains suspended and inclined on the cable by an effect of gravity and a propeller thrust.

Then, the jibs 19 are synchronously turned around an axis of the hinges of the supports 20 to lower the aircraft by landing gear 17 and 18 on the airfield (the landing position) or on the carriage 27 of the catapult 26 (FIG. 3d), and the, engine is cutoff. Other variant considers holding of the aircraft at some height, due to an initial pull of the cable 14 returning of rods 25 of shock-absorbers 24 into the starting position, and then lowering of the aircraft by the first variant. An aircraft inclination depends on deviation of the line 10 from vertical line and from a propeller thrust compensating such deviation.

Thus, it is possible to perform the landing onto the cable of all aircrafts similar to this unmanned aircraft, as well as glides and model aircrafts with landing speed in less than 35 m/sec, for which the track of flight braking (5.6 meters) is comparable with the extension length of the rod 25 (1.5 meters) of the shock-absorber 24. The similar cable landing device will be able used for the passenger aircraft with the track of flight braking of 40-65 meters. In this case, the shock-absorber established instead of the hydraulic cylinder 22 must be the basic damper element, extension of the rod 21 must be more than 2 meters, and the cable rise at the height of 60 meters gives the track of flight braking of 65 meters, due to turning of the jib 19.

For the aircraft with the track of flight braking exceeding 70 meters, it is expediently to pull the catching cable 14 with the help of brake drums established on the cranes or other apparatus, providing the cable suspension at the height exceeding the track of flight braking of the aircraft.

Figure 2:
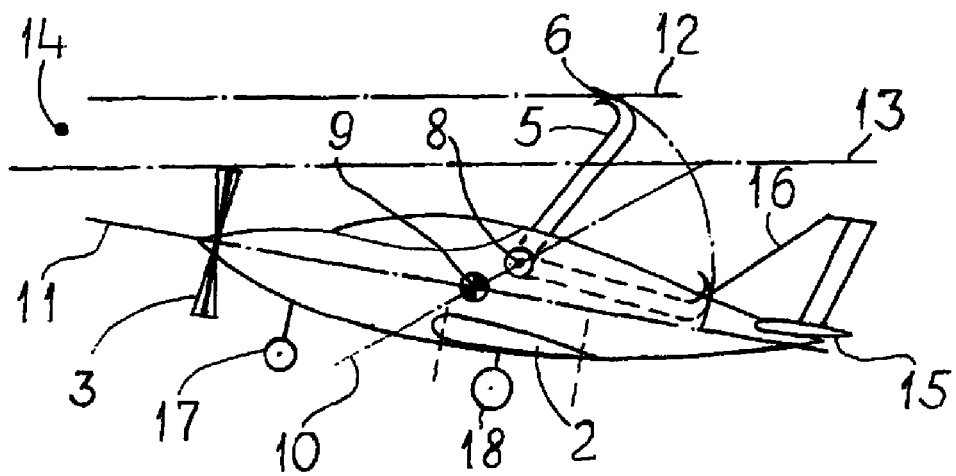
FIG. 2 is a diagrammatic left side view of the least preferable aircraft (II-103, see the table below) with a tractor propeller. The aircraft is shown approaching a cable (a landing angle) 10°) in a level flight.
Figure 4:
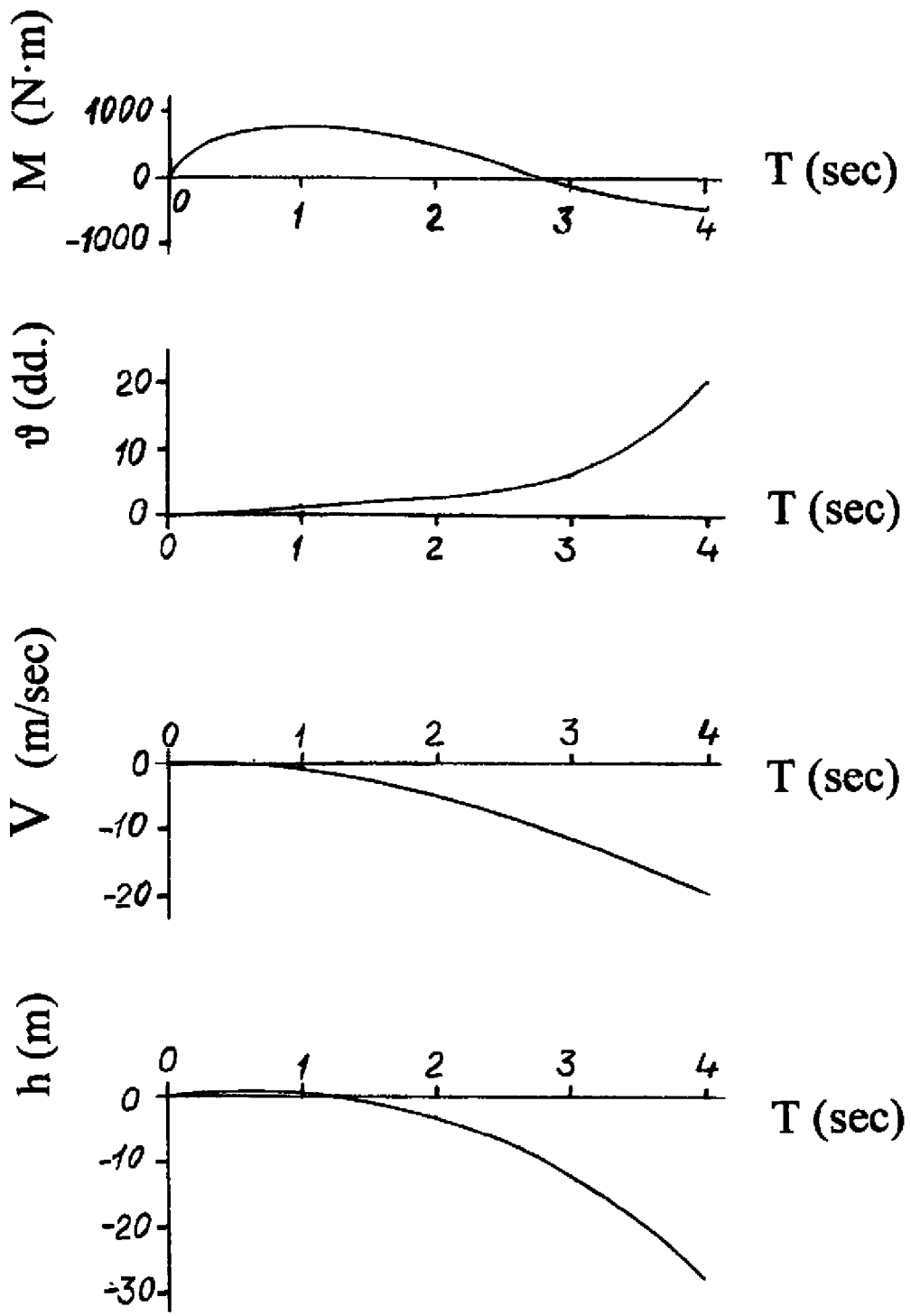
FIG. 4 is four graphs of calculated parameters of the aircraft of FIG. 2 decelerated to stop with the cable landing device.

FIG. 4 shows graphs of separate calculated parameters of motion of the aircraft of FIG. 2, decelerated to stop after an engagement the cable 14 with the arresting hook 5, whose an axis is located, according to the claimed invention, at 0.05 meters above and at 0.1 meters behind the center of gravity of the aircraft.

There are the following graphs as a function of time: the pitching moment (M); the angle of pitch (θ); the descent rate (V) and a value of the aircraft descent (h). (While, the axis of rotation 8 is located at 0.05 meters above and at 0.1 meters behind the center of gravity of the aircraft, the track of flight braking S=72.5 meters, and flight braking period T=4 seconds, if the middle load factor is about 0.9).

Approximate calculations of flight braking are showed insignificant changes of the pitching moment (M)—from zero to plus 514 N·m and then to minus 339 N·m, due to which the aircraft smoothly takes the angle of pitch (θ)—from zero to plus 21.5 degrees, the descent rate (V)—from zero to plus 0.2 m/sec and then to minus 17 m/sec, and the value of the aircraft descent (h)—from zero to plus 0.1 m and then to minus 21.1 m. Experiments with a model airplane have given the excellent results for confirming the calculations.

The invention claimed is:

1. An aircraft comprising a lifting wing, an arresting hook with a grip portion and an axis of rotation of the hook, wherein the axis being located transversely of the aircraft, the hook extends by the grip portion above the aircraft during a landing to be engaged with a cable of a cable landing device situated at a landing position, the hook being mounted on the aircraft capable of rotating around the axis as a result of braking force of engagement with the cable, and the axis being located within an area defined by the longitudinal expanse of the mean aerodynamic chord, above and behind of the center of gravity of the aircraft.

2. The aircraft according to claim 1 is further characterized by the axis being located immobile with respect to the aircraft.

3. The aircraft according to claim 1 is further characterized by the axis being located in parallel to a lateral axis of the aircraft.

* * * * *